Patented Apr. 18, 1944

2,346,858

UNITED STATES PATENT OFFICE 2,346,858

INTERPOLYMER

Charles Joseph Mighton, Wilmington, Del., assignor to E. I. du Pont de Nemours & Company, Wilmington, Del., a corporation of Delaware No Drawing. Application January 14, 1941, Serial No. 374,403

12 Claims. (Cl. 260—23)

This invention relates to new synthetic resins and more particularly to interpolymers of vinyl acetate.

Valuable coating compositions prepared by polymerizing substantial amounts of vinyl acetate with non-frosting drying oils such as bodied linseed oil, soya bean oil, or perilla oil, and the like, are known. However, under the conditions which are suitable for preparing various interpolymers of vinyl acetate with non-frosting oils, vinyl acetate fails to interpolymerize to a satisfactory degree with frosting drying oils, and the products obtained thereby are, in themselves, of little value as coating compositions.

This invention has as an object the provision of a process whereby vinyl acetate is polymerized readily with frosting drying oils to give compatible interpolymers containing large amounts of polymerized vinyl acetate and possessing greatly improved film-forming properties. Other objects will appear hereinafter.

These objects are accomplished by the following invention wherein monomeric vinyl acetate is interpolymerized with a reaction product of a frosting drying oil with a minor proportion, i. e., 5-50% by weight, based on the frosting drying oil, of an aliphatic compound containing an ethylenic double bond between two carbons at least one of which is attached to a carbon atom all of the remaining valences of which are satisfied thru polyvalent electronegative inorganic elements of the first full period of the periodic system i. e., oxygen or nitrogen, i. e., an alpha,beta-unsaturated acid or a simple derivative thereof, such as an ester, anhydride, amide or nitrile thereof. The term "amide" is defined as the derivative of the carboxylic acid wherein the carboxyl hydroxyl is replaced by the NH2 group.

When monomeric vinyl acetate is heated with frosting drying oils such as, for example, China-wood oil, oiticica oil, their varnishes (compositions prepared by heating the oils with oil-soluble resins), or mixtures of such oils with non-frosting oils, e. g., linseed or soya bean oils, under commonly used polymerization conditions, polymerization of the vinyl acetate is largely inhibited. Even when a large excess of vinyl acetate is employed and the heating is continued for very long times, i. e., 20-30 hours, at temperatures of 70-130° C., the final resinous products are found to contain only relatively small amounts (15-20% or less) of polymerized vinyl acetate; furthermore the reaction mixtures often gel and the products are not generally satisfactory for coating compositions due to their inferior film properties and marked tendency to frost on drying.

These difficulties may be overcome by incorporating with the frosting oils minor proportions by weight (less than 50%) of alpha,beta-unsaturated carboxylic acids or their simple derivatives. In most cases, it is preferable to react the alpha,-beta-unsaturated acid or its derivative with the frosting oil by heat treatment prior to polymerization with vinyl acetate. Thus, on heating raw China-wood oil with methyl methacrylate in the ratio of 1 mol China-wood oil:0.75-1.0 mol methyl methacrylate with a catalytic amount of benzoyl peroxide at elevated temperatures, e. g., 200° C., for a relatively short time, a modified China-wood oil of higher viscosity is obtained which, like the raw oil, is characterized by frosting on drying. When this oil is heated with a substantial excess of monomeric vinyl acetate, for example, at 130° C., preferably in the presence of a peroxide catalyst, e. g., 1-2% of benzoyl peroxide, and preferably in the absence of inert diluents, interpolymers which are soluble in aromatic hydrocarbons and which contain substantial amounts of polymerized vinyl acetate are obtained. In this manner interpolymers which contain 58% of interpolymerized vinyl acetate are obtained after a reaction period of five hours. Flowouts of these interpolymers dry rapidly to hard, tough, glossy and adherent films free from frost.

Similar results are obtained by using maleic anhydride in place of methyl methacrylate with raw China-wood oil. With this particular alpha,-beta-unsaturated acid derivative it is preferable simply to heat at reflux temperature and with constant stirring a mixture of an excess of vinyl acetate monomer, China-wood oil and maleic anhydride, the latter two constituents being present preferably in a weight ratio of approximately 2.5:0.5-1.0, using 1-2% of benzoyl peroxide (based on the vinyl acetate monomer) as a catalyst. Heating is continued until the desired degree of interpolymerization is obtained; for many purposes this is conveniently determined as the point where films flowed from the resin solution upon drying at room temperature or at elevated temperatures are clear and homogeneous and free from frost. The polymerization may also be followed by solids determinations on samples taken from the reaction mixture. By this means there are obtained interpolymers containing substantial amounts of interpolymerized vinyl acetate, e. g., 25-80% which are soluble in aromatic hydrocarbons, and which dry rapidly to hard, tough, glossy films possessing excellent adhesion to metals and good water resistance. Products having less than 25% vinyl acetate interpolymerized are soft and slow drying. Those having more than 80% vinyl acetate interpolymerized tend to be brittle and to have poor adhesion.

The resinous interpolymer solutions prepared by the above methods may be used as such, or preferably the excess vinyl acetate monomer may be removed and recovered by vacuum distillation, the vinyl acetate being replaced continuously or at intervals with a suitable solvent such as high flash naphtha, xylene, toluene, or benzene during the distillation.

The more detailed practice of the invention is illustrated by the following examples, wherein parts given are by weight. There are of course many forms of the invention other than these specific embodiments.

Example I

A mixture comprising 25 parts raw China-wood oil, 10 parts maleic anhydride, 200 parts freshly distilled vinyl acetate monomer, and 2 parts benzoyl peroxide is heated with stirring under reflux at 73° C. for 14⅔ hours. A solids determination of the resin solution after this time shows that an interpolymer containing 34% of polymerized vinyl acetate has been obtained. Excess vinyl acetate monomer is recovered from the reaction mixture by vacuum distillation, xylene being added from time to time in order to maintain solution of the interpolymer. The solution is then adjusted to 40% solids in xylene. Flowouts of the resin solution with or without driers set up rapidly on air drying or baking to give clear, light-colored, hard, tough, glossy films which are free from frost and exhibit excellent adhesion to wood or metals and possess good resistance to water.

Interpolymers of higher vinyl acetate content may be obtained by such means as conducting the reaction for longer periods of time or by increasing the temperature (by application of pressure, if necessary). Thus, after heating the above reaction mixture for 18 hours, an interpolymer of 42.8% vinyl acetate content is obtained, and after 22½ hours, the interpolymer contains 46% of interpolymerized vinyl acetate. As the content of vinyl acetate is increased, films of the interpolymers become progressively harder and more rapid drying. The interpolymers may be plasticized, for example, with dibutyl phthalate or tricresyl phosphate.

Enamels of these interpolymers may be prepared readily by any of the usual methods. The following illustrates the preparation of a typical enamel of a 57% vinyl acetate-12% maleic anhydride-31% China-wood oil interpolymer: A mixture comprising 55 parts of a 40% solution of the interpolymer in xylene, 50 parts of antimony oxide, 50 parts of titanium dioxide and 50 parts of a toluene-xylene (1:1) mixture is ground in a ball mill for approximately 72 hours. To the mill base so obtained is added 195 parts more of the 40% xylene solution of the interpolymer and, after mixing, the resulting enamel is cut with xylene to the desired viscosity for brushing or spraying. The enamel sets up essentially at lacquer speeds on air drying to give hard, tough, glossy films having excellent adhesion to wood or steel.

Example II

A mixture consisting of 25 parts of a preformed heat-blended China-wood oil-Amberol F-7 (a rosin modified phenol-formaldehyde resin) varnish (10 parts resin to 90 parts oil), 10 parts of maleic anhydride, 300 parts of vinyl acetate monomer, 175 parts of xylene and 3 parts of benzoyl peroxide is heated with constant stirring at 82° C. for 6 hours. Flowouts of the interpolymer solution so obtained air dry to the tack free stage in 20-30 minutes at 25° C., giving clear and compatible hard, tough, glossy and adherent films free from frost. A solids determination of the resin solution shows that the interpolymer contains 50% of polymerized vinyl acetate.

In the absence of maleic anhydride, vinyl acetate fails to polymerize satisfactorily in the presence of raw China-wood oil or preformed China-wood oil-resin varnishes under the above conditions. Even after refluxing for periods of 27 hours, flowouts of the final solutions give soft, cheese-like films of poor strength which frost like the original oil or varnish on drying.

Example III

A mixture of 12.5 parts of heavy-bodied blown linseed oil, 12.5 parts of raw China-wood oil, 10 parts of maleic anhydride, 200 parts of vinyl acetate, and 2 parts of benzoyl peroxide is heated under reflux, with stirring for 11 hours. Flowouts of the resulting resin solution set up essentially tack free in five minutes to clear and compatible, hard, tough, glossy films which exhibit good water resistance and excellent adhesion to steel or wood. A solids determination of the solution shows that 52% of the solid product consists of polymerized vinyl acetate. The films show no tendency to frost on drying at ordinary or elevated temperatures. In the absence of maleic anhydride, vinyl acetate fails to polymerize to any appreciable extent with the above mixture of linseed oil and raw China-wood oil under the same conditions.

Example IV

A mixture comprising 61 parts of raw China-wood oil, 7 parts of methyl methacrylate and 0.1 part of benzoyl peroxide is heated in a sealed vessel for two hours at 200° C. An oil of body Y-Z (Gardner-Holdt scale) is obtained which dries like raw China-wood oil, giving soft films characterized by frosting and wrinkling.

A mixture of 10 parts of the bodied China-wood oil obtained above, 60 parts of vinyl acetate monomer and 1.2 parts of benzoyl peroxide is heated in a sealed vessel at 130° C. for five hours. An interpolymer containing 55% of polymerized vinyl acetate is obtained which is readily soluble in aromatic hydrocarbons. Flowouts from xylene solutions of the interpolymer containing 0.3% of cobalt drier dry essentially tack free in 15 minutes, giving clear and glossy, tough, flexible films of good adhesion to wood or metals. The interpolymer is compatible with oil-soluble phenol-formaldehyde resins such as p-hydroxydiphenyl-formaldehyde resin with rosin and nitrocellulose, and with China-wood oil-modified glyptal resins.

If, in place of the above preformed reaction product of China-wood oil with methyl methacrylate, merely a cold blended physical mixture of raw China-wood oil, methyl methacrylate, vinyl acetate and benzoyl peroxide is heated at reflux or higher temperatures for long periods of time, i. e., 15-23 hours, the final resinous products contain only minor proportions, i. e., 15-20% of polymerized vinyl acetate. Interpolymers prepared in this manner tend to frost and wrinkle badly on drying, giving soft films which differ little from films of raw China-wood oil and which are of little value as coating compositions in themselves.

The reaction product of the frosting drying oil with the alpha,beta-unsaturated acid derivative must be preformed, to obtain the result desired, in the case of monocarboxylic acid derivatives. However, in the case of maleic, fumaric, itaconic, citraconic, etc. acid derivatives and Δ2-butene-1,4-dicarboxylic acid derivatives having the structure X≡C—CR═CR'—C≡X wherein X is one or more groups united to the carbon thru polyvalent inorganic elements of the first full period, R and R' being hydrogen or lower alkyl radicals, the reaction product of the alpha,beta-unsaturated acid derivative with the frosting drying oil is preferably formed in situ.

The above examples have illustrated the invention with interpolymers of vinyl acetate with reaction products of China-wood oil and minor proportions by weight (less than 50%) of methyl methacrylate or maleic anhydride, but the invention is generically applicable to interpolymers of vinyl esters with combinations of any frosting drying oil and any alpha,beta-unsaturated acid or a derivative thereof, for example, the anhydride, ester, amide, N-substituted amide or the corresponding nitrile.

By the term frosting drying oil is meant oils which are characterized by their tendency to frost on drying such as China-wood oil, oiticica oil, and Japanese wood oil, any bodied modification of these, cold or hot blended mixtures of two or more such frosting oils, frosting drying oil-gum varnishes prepared by heat blending or cold blending of frosting oils with oil-soluble natural or synthetic varnish gums, or mixtures of one or more of the above frosting oils or varnishes with one or more non-frosting oils such as raw or bodied linseed, soya bean, perilla, castor, dehydrated castor oil, and the like, provided that the mixture is such that it frosts on drying.

In general, any oil, combination of oils, or varnishes which are characterized by their tendency to frost on drying are applicable in the present invention.

By alpha,beta-unsaturated acid or derivative thereof is meant acids, e. g., maleic, fumaric, methycrylic, crotonic, sorbic, acrylic, alpha-chloroacrylic, alpha-phenylacrylic, beta-phenylacrylic, beta - furylacrylic, alpha-cyano-beta-furylacrylic, itaconic, mesaconic acid and the like having an ethylenic double bond between the carbon next to the carboxyl and the carbon once removed therefrom. Their derivatives include the anhydrides, amide, N-substituted amides, esters, and nitriles.

In combining the frosting oils with a minor proportion, i. e., 5–50% by weight based on the drying oil, of an alpha,beta-unsaturated acid or a derivative thereof either prior to or during interpolymerization with vinyl acetate, the apparent net effect is to offset the inhibitory effect which frosting oils exhibit on the polymerization of vinyl acetate. Under the preferred conditions as described herein such a combination does not materially reduce the drying properties of the oil. The alpha,beta-unsaturated acid derivatives vary greatly in the readiness with which they modify the interpolymerization of vinyl esters with frosting drying oils, as illustrated in the examples. In some cases the reagent may be merely included in the polymerization mixture, as with maleic anhydride and other derivatives having the X≡C—C═C—C≡X grouping described above. With other agents, as with methyl methacrylate, and other monocarboxylic acid derivatives, a preliminary heating with the oil is necessary.

In such cases the period and temperature of heating required will vary depending on the particular oil employed, and the alpha,-beta-unsaturated acid or its derivative chosen for the combination. In general, the higher the temperature, the shorter the period of heating required to obtain the desired combination. The temperature and period of heating must be chosen so as not to cause gelation and insolubility of the resulting oil, however.

Generally, when an initial reaction product is obtained by preheating the oil and one component, as is preferable with most alpha,beta-unsaturated monocarboxylic acids and their derivatives, and especially with methacrylic or acrylic acid derivatives, most satisfactory results will be obtained when 0.75 mol–1.0 mol of the latter are combined with one mol of the frosting oil.

Smaller proportions of the alpha,beta-unsaturated acids or their derivatives may be used, however, with usually a slower rate of reaction with the vinyl acetate. Larger proportions of alpha,beta-unsaturated acids or their derivatives can be combined with the oils, although sometimes at considerable sacrifice in drying properties of the resulting oils. It is sometimes advantageous to conduct the combination of the oils with the alpha,beta-unsaturated acid derivatives in the presence of peroxide catalysts, although inclusion of such catalysts is not necessary.

As mentioned above, with alpha,beta-unsaturated alpha,beta-dicarboxylic acids and their derivatives, particularly maleic and fumaric acids and their derivatives, having an ethylenic double bond doubly conjugated, i. e., conjugated at both ends with a plural bond between a carbon attached to the ethylenically bonded carbon and an inorganic polyvalent electronegative element of the first full period, it is not necessary that they be combined with the frosting drying oil by heat treatment prior to interpolymerization with vinyl acetate. Thus, interpolymerization of vinyl acetate with combinations of China-wood oil and maleic anhydride is preferably effected simply by heating a physical mixture of the three components in the presence of a peroxide catalyst as in Example I. Under these conditions, interpolymerization proceeds most rapidly and the most satisfactory products from many standpoints are obtained when 1.5–3.0 mols of maleic or fumeric acids or their derivatives per mol of China-wood oil are employed in the original reaction mixture. Greater or lesser proportions than these may be employed, however, depending on the desired properties of the final products; generally with smaller proportions of such alpha,beta-unsaturated acids and their derivatives, interpolymerization of vinyl acetate takes place more slowly and less completely; when larger proportions are employed interpolymerization takes place rapidly but the final products exhibit poorer can stability and are apt to gel during isolation from excess vinyl acetate monomer. It will be seen from this and the previous paragraph that the ratio of alpha,beta-unsaturated acids or their derivatives to frosting oil chosen for combination may be varied considerably since the properties of the resulting frosting oils are dependent to some extent on the chosen acids or their derivatives, the particular oil, and on the methods by which the combinations are effected. The above proportions represent only the preferred limits for the preparation of interpolymers having most attractive properties in many respects for coating compositions; it is to be understood, however, that the invention is not limited to these preferred limits.

The ratio of vinyl acetate to the oil combination employed may likewise be varied over wide limits with satisfactory results. In general, it is desirable to employ a considerable excess of vinyl aceate, such as 6-12 parts by weight per part of oil, stopping the interpolymerization when products having the desired properties or desired ratio of polymerized vinyl acetate to oil are obtained. The excess of vinyl acetate may then be recovered, preferably by vacuum distillation, a suitable higher boiling solvent such as toluene, xylene, high flash naphtha, ethyl or butyl acetate or the like being added from time to time during the distillation to maintain the interpolymer in a limpid form. Lower ratios than the above preferred ratios may be employed, but longer periods of heating are required to obtain interpolymers of relatively high vinyl acetate content; higher ratios likewise may be employed; but with no significant advantage other than that of a slight reduction in the period of heating required to obtain interpolymers of selected vinyl acetate content. Inert diluents which serve both as solvents for the reactants and products may be employed, but such diluents generally offer little specific advantages, particularly when a considerable excess of vinyl acetate monomer is employed. It is preferable, but not necessary, to accelerate interpolymerization of vinyl acetate with the oil by employing 1-2% (based on the vinyl acetate monomer) of peroxide catalysts such as benzoyl peroxide, hydrogen peroxide, acetyl peroxide or the like.

The operating conditions under which vinyl acetate may be interpolymerized with reaction products of frosting drying oils and alpha,beta-unsaturated acids or their derivatives may be varied widely, as illustrated in the examples. It is preferable to conduct the interpolymerization of vinyl acetate with many of these reaction products, particularly preformed products prepared by heating the oil and the alpha,beta-unsaturated acid or its derivative at approximately 200° C., at temperatures appreciably above the boiling point of vinyl acetate, for instance at 130° C. in sealed reaction vessels. Preferably temperatures in the range of 100° C.-150° C. are employed although valuable interpolymers may be obtained when operating at temperatures above or below these limits. Such operating conditions are particularly advantageous when soluble interpolymers of relatively high vinyl acetate content, e. g. 40-60%, are desired. At lower temperatures, interpolymerization proceeds more slowly and usually products of relatively low vinyl acetate content are obtained. At higher temperatures, i. e., greater than 150° C., the reaction mixtures tend to gel more readily and interpolymers which are insoluble in organic solvents may be obtained. However, although insoluble interpolymers are less useful in coating composition applications, they are valuable for molding into articles of various shapes. On the other hand, with combinations of frosting drying oils with alpha,beta-unsaturated acids having 1,6 conjugations such as maleic or fumaric acid or their derivatives, it is preferable to conduct the reaction and interpolymerization with vinyl acetate simultaneously, at temperatures of 50-100° C., and preferably at 70-80° C. To generalize, the reaction may be carried out at temperatures of 50-150° C. or higher, the exact temperature to be used depending on the combination selected and the desired properties of the products.

If desired, other polymerizable monomers such as methyl vinyl ketone and other vinyl ketones, vinyl ethers, vinyl chloride, styrene, etc., may be present as a minor proportion of the polymerizable monomers in the original reaction mixture and thereby interpolymerized with vinyl acetate and the combinations of frosting drying oils with alpha,beta-unsaturated acids or their derivatives described herein. The vinyl ester should, however, be present in major proportion of the polymerizable monomers present and be itself in excess of the frosting oil reaction product.

In place of vinyl acetate, vinyl esters of monocarboxylic acids in general may be used including vinyl chloroacetate, vinyl formate, vinyl benzoate, and the like. However, vinyl acetate is preferred because of its availability and the preferred results obtained therefrom.

The vinyl esters of the lower aliphatic monocarboxylic acids, i. e., up to four carbon atoms including acetic acid form a somewhat more inclusive preferred class.

The invention is generic to the use of frosting compositions containing a frosting drying oil and to the use of alpha,beta-ethylenically unsaturated acids and their derivatives listed above in which compound an ethylenically bonded carbon is attached by a single bond to a carbon all of the remaining valences of which are satisfied by electro-negative inorganic i. e. non-carbon, elements of the first full period of the periodic system, one of which elements is united to the carbon by a plural bond.

The interpolymers of vinyl esters of monocarboxylic acids and preferably of vinyl acetate with combinations of frosting drying oils and alpha,beta-unsaturated acids or their derivatives described herein are highly useful in coating compositions. The resin solutions may be sprayed or brushed to give films which after drying are clear, glossy, flexible, tough, and adherent, and which show good resistance to water, cold dilute aqueous acid and alkali solutions. The films dry rapidly to the tack-free stage chiefly by solvent evaporation apparently, and polymerize further on aging. If desired, plasticizers and certain natural or synthetic resins may be incorporated to modify the properties of these interpolymers. Pigments may be readily dispersed in these resins to give enamels of good gloss which likewise possess the attractive film-forming properties of the unmodified interpolymers. The products are highly useful, therefore, as coatings for wood, metals, stone, brick, cement, glass, wire, textiles, cloth and fabrics, transparent films, paper and the like. The resins are further useful as molding compositions or as binders for fillers, pigments, dyes and the like.

The above description and examples are intended to be illustrative only. Any modification of or variation therefrom which conforms to the spirit of the invention is intended to be included within the scope of the claims.

What is claimed is:

1. Process which comprises interpolymerizing a monomeric vinyl ester of a saturated monocarboxylic acid at 50-150° C. with the organic solvent soluble product of the reaction, by heating, of a frosting drying oil composition with a minor proportion, based on the frosting drying oil, of a member of the class consisting of alpha,beta-ethylenically unsaturated carboxylic acids and esters, primary amides, nitriles, and anhydrides thereof.

2. Process which comprises heating vinyl acetate at 50-150° C. with the organic solvent soluble product of the reaction, by heating, of a frosting drying oil composition with a minor proportion, based on the frosting drying oil, of a member of the class consisting of alpha,beta-ethylenically unsaturated carboxylic acids and esters, primary amides, nitriles, and anhydrides thereof.

3. Process which comprises heating vinyl acetate at 50-150° C. with the organic solvent soluble product of the reaction, by heating, of a frosting China-wood oil composition with a minor proportion, based on the China-wood oil, of a member of the class consisting of alpha,beta-ethylenically unsaturated carboxylic acids and esters, primary amides, nitriles, and anhydrides thereof.

4. Process which comprises heating an excess of vinyl acetate at 50-150° C. with the organic solvent soluble product of the reaction, by heating, of a frosting China-wood oil composition with a minor proportion, based on the China-wood oil, of maleic anhydride, the reaction product being formed in situ.

5. Process which comprises heating an excess of vinyl acetate at 100-150° C. with the preformed, organic solvent soluble product of the reaction, by heating, of a frosting China-wood oil composition with a minor proportion, based on the China-wood oil, of a methacrylic acid ester.

6. Process which comprises heating an excess of vinyl acetate of 100-150° C. with the preformed, organic solvent soluble product of the reaction, by heating, of a frosting China-wood oil composition with a minor proportion, based on the China-wood oil, of methyl methacrylate.

7. An interpolymer containing 25-80% of a vinyl ester of a saturated monocarboxylic acid interpolymerized at 50-150° C. with the organic solvent soluble product of the reaction, by heating, of a frosting drying oil composition with a minor proportion, based on the frosting drying oil, of a member of the class consisting of alpha,beta-ethylenically unsaturated carboxylic acids and esters, primary amides, nitriles, and anhydrides thereof.

8. An interpolymer containing 25-80% of vinyl acetate interpolymerized at 50-150° C. with the organic solvent soluble product of the reaction, by heating, of a frosting drying oil composition with a minor proportion, based on the frosting drying oil, of a member of the class consisting of alpha,beta-ethylenically unsaturated carboxylic acids and esters, primary amides, nitriles, and anhydrides thereof.

9. An interpolymer containing 25-80°% of vinyl acetate interpolymerized at 50-150° C. with the organic solvent soluble product of the reaction, by heating, of a frosting China-wood oil composition with a minor proportion, based on the China-wood oil, of a member of the class consisting of alpha,beta-ethylenically unsaturated carboxylic acids and esters, primary amides, nitriles, and anhydrides thereof.

10. An interpolymer containing 25-80% of vinyl acetate interpolymerized at 50-150° C. with the organic solvent soluble product, formed in situ, of the reaction, by heating, of a frosting China-wood oil composition with a minor proportion, based on the China-wood oil, of maleic anhydride.

11. An interpolymer containing 25-80% of vinyl acetate interpolymerized at 50-150° C. with the preformed, organic solvent soluble product of the reaction, by heating, of a frosting China-wood oil composition with a minor proportion, based on the China-wood oil, of a methacrylic acid ester.

12. An interpolymer containing 25-80% of vinyl acetate interpolymerized at 50-150° C. with the preformed, organic solvent soluble product of the reaction, by heating, of a frosting China-wood oil composition with a minor proportion, based on the China-wood oil, of methyl methacrylate.

CHARLES JOSEPH MIGHTON.